C. M. BURTON, G. P. SALISBURY & C. S. WELLS.
CARTRIDGE-CAPPING MACHINE.
No. 181,309.
2 Sheets—Sheet 1.
Patented Aug. 22, 1876.
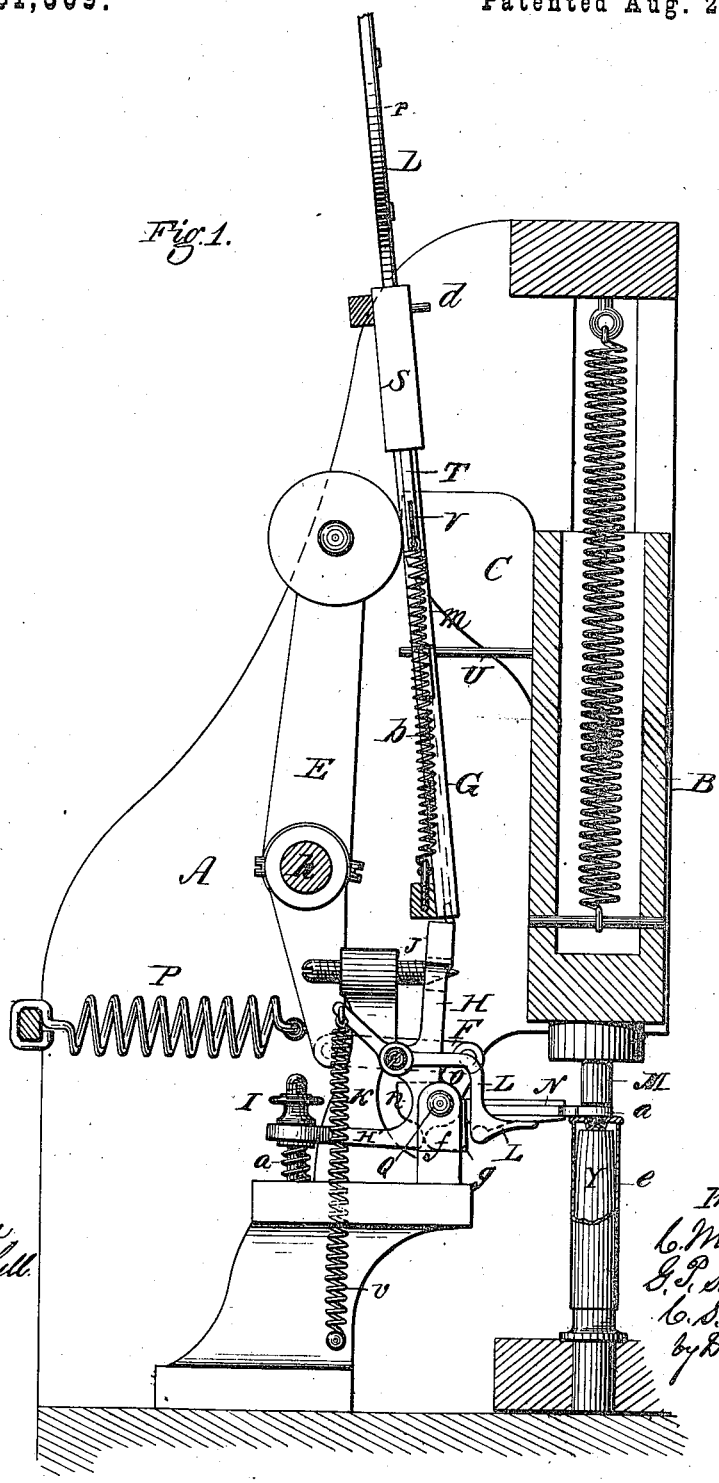

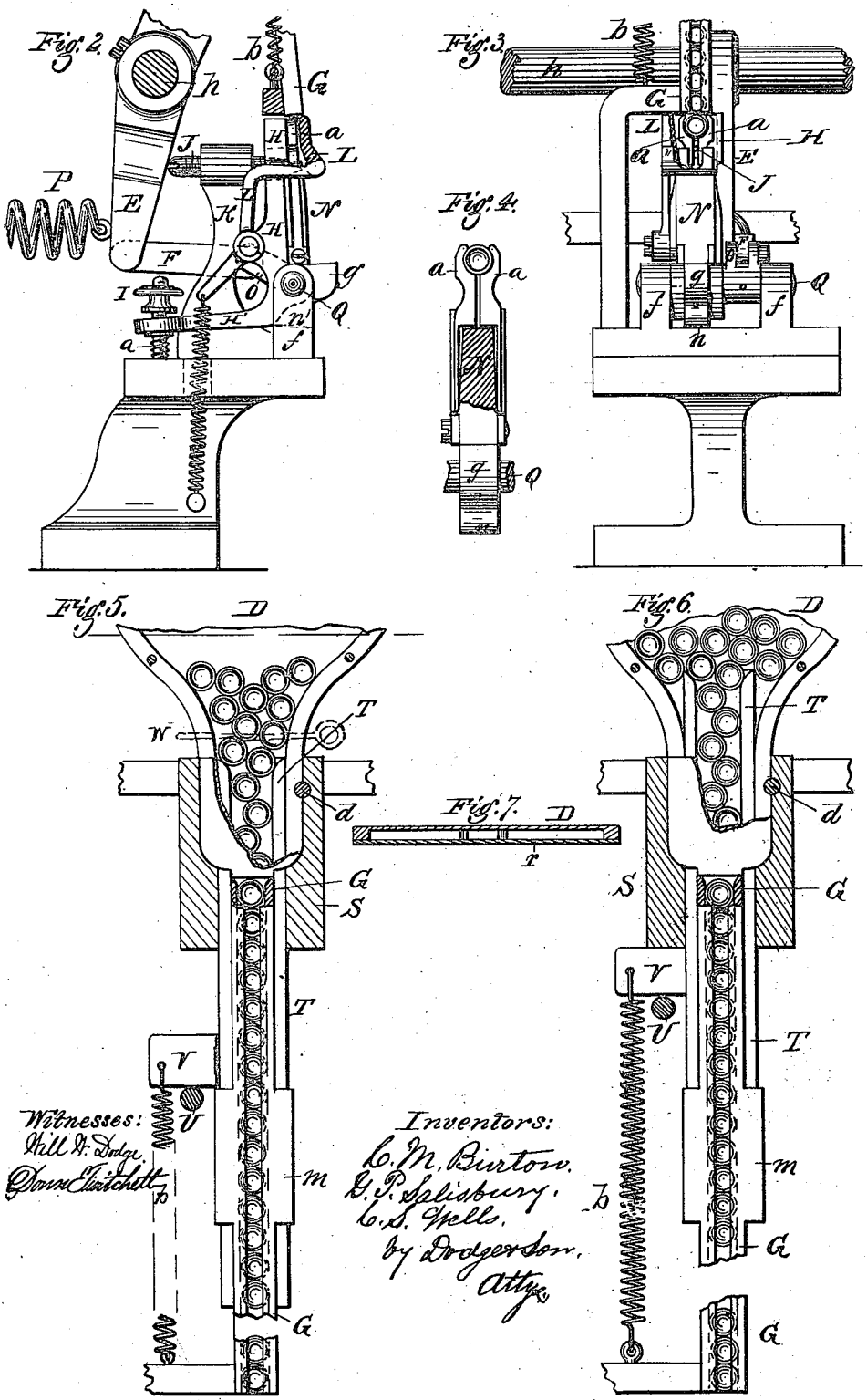

UNITED STATES PATENT OFFICE.

CHARLES M. BURTON, GEORGE P. SALISBURY, AND CHARLES S. WELLS, OF NEW HAVEN, CONN., ASSIGNORS TO THE WINCHESTER REPEATING ARMS COMPANY, OF SAME PLACE.

IMPROVEMENT IN CARTRIDGE-CAPPING MACHINES.

Specification forming part of Letters Patent No. 181,309, dated August 22, 1876; application filed August 7, 1876.

*To all whom it may concern:*

Be it known that we, C. M. BURTON, G. P. SALISBURY, and CHARLES S. WELLS, of New Haven, in the county of New Haven and State of Connecticut, have invented certain Improvements in Cartridge-Capping Machines, of which the following is a specification:

Our invention consists in an improved device for feeding caps or primers to cartridge-shells, and in a novel contrivance for setting the caps or primers in place, as hereinafter more fully described.

In the drawings, Figure 1 represents a side view of our improved apparatus complete, a portion of the frame being broken away to show the parts more clearly. Fig. 2 is a side view of the device for setting the primers in place in the head of the shell, the machine being represented in the act of receiving a primer from the feeding device; Fig. 3, a face view of the same with the parts in the same position as in Fig. 2; Fig. 4, a view of the spring-arms, which receive the primer detached; and Figs. 5, 6, and 7, detail views of the feeding mechanism.

The feeding mechanism forms the first part of our invention; and consists of a reservoir or hopper, D, of suitable size, provided on its front with a transparent plate, there being just sufficient space left between the front and back plates of the hopper or reservoir to allow the primers to move freely between them when placed in flatwise. At its lower end the hopper D is formed with straight sides, as shown in Figs. 5 and 6, the straight portion being seated in a socket in the block S. A circular opening is formed, partly in the side of the hopper D, and partly in the block S, to receive a pin, d, which locks the hopper D in place. The block S is attached securely to the frame of the machine, and, while the machine is in operation, the hopper remains in a fixed position, but, by removing the pin d, it may be detached from the machine for the purpose of refilling. Before commencing to operate the machine the hopper is filled with primers, each having its concave face turned toward the transparent face of the hopper, as shown in Figs. 5 and 6. Extending from the lower end of the hopper D to the point where the primers are taken by the device which places them on the shells is a tube, G, the opening in which corresponds in its general form to the longitudinal section of the primers, it being, however, sufficiently large to allow the primers to move freely, one at a time, through it. The upper end of the opening in the tube G is made beveling or hopper-shaped, as shown in Figs. 5 and 6, for the purpose of causing the primers to enter it more readily. Passing outside of the tube G, and extending up into the mouth of the hopper D, is a slide, T, the lower end of which moves in suitable guides m, as shown in Figs. 1, 5, and 6. As shown in the two figures last mentioned, the upper end of this slide is also made in the form of a hopper. Extending outward from the side of the slide T is an arm, V, which is connected, by means of a spiral spring, b, with some portion of the frame of the machine located below the arm V, the spring b tending to draw the slide down. Projecting outward from the head-block B of machine, which head-block has a vertically-reciprocating motion, is an arm or pin, U, which, as the head-block B ascends, engages under the arm V and raises it up, causing the slide T to move upward into the hopper D, as shown in Fig. 6.

It will be seen that this movement of the slide T causes it to take in or receive those primers which stand in a line directly above it, and that, as they pass down the slide T, they come to the hopper-shaped mouth of the tube G, into which they fall, and down which tube they pass to the setting device above mentioned.

It will be readily seen that any clogging which might otherwise occur at the lower end of the hopper is thus effectually broken up. As the head-block B again descends, the arm U passes down and allows the slide T to be drawn down by the spring b to the position indicated in Fig. 5, the downward motion of the slide being limited by the arm V coming in contact with the guide m. It will be seen that, as represented in Figs. 3, 5, and 6, the tube G has an opening in its front face, which allows the operator to see the condition of the primers in the tube, and through which they may be reached for the purpose of dislodging such as may become clogged by dust or other foreign material.

The next feature of our invention consists in a device by which the primers are received from the feeding apparatus and deposited and set in the recess in the head of the shell. The shells e are placed upon metal pins Y, which are mounted on a revolving dial, and are, successively, brought around to the proper position to receive the cap or primer, and come directly under the punch or plunger M of the head-block B. As before stated, this head-block has a vertical movement up and down in its frame A, it being operated by any suitable mechanism.

The primers are fed down the tube G in the manner already described. Before commencing to operate, the head-block stands in an elevated position, and the parts composing the capping device assume the positions indicated in Figs. 2 and 3.

Mounted and turning freely in bearings f is a cylindrical shaft, Q, to which is rigidly attached an arm, N, and an elbow-lever, O, said lever being connected by means of a link, F, to the operating-lever E, pivoted on the shaft A. As shown in Figs. 1 and 2, a spiral spring, P, is attached, one end to the lower end of the operating-lever E, and the other end to the frame of the machine, in rear of said lever. Located, and free to turn, upon the shaft Q, is a second arm, H, which extends out back of the arm N, and stands, when at rest, in a vertical position directly under the mouth of the tube G. Extending backward from the vertical arm H is a tail-piece, H', which is enlarged at its rear end, and encircles a screw, which is encircled by a spiral spring, a, which bears upward on the tail-piece H', the upward movement being regulated by a thumb-nut, I. Directly in rear of the upright arm H is a fixed standard, K, carrying in its upper end a conical-pointed screw, J, which projects through an opening formed near the upper end of the arm H, as shown in Fig. 1. The arm N is cut away at its upper end to clear the point of the screw J, as shown in Fig. 3, and is provided with two spring-arms, a, which extend above the arm N, and are enlarged so as to come close together above said arm. The inner faces of the spring-arms a are made semicircular at their upper ends, as shown in Fig. 4, to allow them to fit closely against the primers, which they are designed to hold.

The head-block B being elevated, the spring P, acting through the medium of the link F and elbow-lever O, draws the arm N against the arm H with sufficient force to cause the latter to move back from under the mouth of the tube G, leaving the primers, which were thus prevented from leaving the tube, free to drop down. At the same time, the spring-arms a, coming directly under the mouth of the tube G, are separated and spread apart by the conical point of the screw J, which enters between them as they are drawn toward it by the action of the spring P. The arms a are thus spread apart a sufficient distance to allow a primer to drop in between the semicircular faces, the space being only deep enough to admit one at a time. The reverse or downward movement of the head-block B reverses the action of the parts. The cam O, on the rear of the head-block B, forces the upper end of the lever E outward, which, in turn, operating through the link F and elbow-lever O, throws the arm N down into the position shown in Fig. 1, the arms a bringing the primer directly over the recess in the head of the shell e. The continued downward movement of the head-block B causes the punch or plunger M to force the primer down into the recess in the head of the shell e.

It will be readily observed that, as the arms a move off from the point of the screw J, they spring together and clasp the primer tightly between them. At the same time, the pressure of the arm N against the upright arm H being removed, the spiral spring a, acting under the tail-piece H', will throw the upper end of the arm H under the mouth of the tube G, and thus prevent the primers from dropping out of the same.

In order to prevent the primers from falling out from between the arms a before they have moved off from the screw J, I provide a swinging gate, L, which is pivoted to the arm H back of and above the center of motion of the arm N, as shown in Figs. 1, 2, and 3, so that when the arm N is in a vertical position, the gate L will lie across in front of the upper ends of arms a; but as the arm N descends, the gate L will draw back away from said arms and lie along under the arm N, as shown in Fig. 1.

A spiral spring, v, is attached to the rear end of the arm carrying the gate L, for the purpose of keeping the gate constantly against the arm N. The arm N is provided at its lower end with two square shoulders, $s$ and $g$, which come alternately in contact with the bed of the device—one when the arm N is up and the other when it is down—to limit the motion of said arm.

The arms a may be forced more or less apart by adjusting the screw J in and out, and the movement of the arm H may be regulated by means of the thumb-nut I.

If desired, the primers may be fed into tubes before coming to the machine, in which case the hopper would not need to be attached; but we prefer to use the hopper as described.

It is obvious that this feed may be used for other articles than primers with equal advantage, and that the hopper or magazine, with its agitator, may be used to feed the primers into tubes G preparatory to placing the tube, with its contents, in position on a machine to deliver the primers to the device which places them on the shells. In this way the tubes G may be filled with the primers in advance, and the tubes be placed in position on the machine successively as fast as exhausted. In that case the tubes G will be made much longer, so as to hold a larger supply, and to expedite the operation a series of these tubes thus charged may be arranged side by side, so that when one is emptied it will only be necessary to slide a full one along in its place.

By making the hopper D detachable, it can be removed and refilled while the primers in the tube G are being fed to the shells.

Having thus described our invention, what we claim is—

1. The magazine or hopper D, with the reciprocating tube T, constructed to operate substantially as and for the purpose set forth.

2. The combination of the hopper D, reciprocating tube T, and the stationary tube G, substantially as set forth.

3. The pivoted arm N, provided with the spring-clamps a, in combination with the gate L, the yielding stop-piece H, and the pointed pin or screw J, all constructed and arranged to operate substantially as described, whereby the primers are transferred from the tube G to the head of the shell, as set forth.

4. The combination, substantially as set forth, of the tube G, stop H, carrier-arm N, sliding gate L, and reciprocating punch M, all arranged to operate substantially as set forth.

5. In a capping-machine, a pivoted or swinging arm N, constructed to operate substantially as described, whereby it shall receive a primer from the mouth of a supply-tube, and transfer it to a cartridge-shell, substantially as set forth.

CHARLES M. BURTON.
GEORGE P. SALISBURY.
CHARLES S. WELLS.

Witnesses:
DANIEL H. VEADER,
T. L. BURNETT,
WM. SCHAUMLEFFEL,
E. W. CROZIER.